(12) United States Patent
Drury et al.

(10) Patent No.: US 7,751,709 B2
(45) Date of Patent: Jul. 6, 2010

(54) METHOD AND SYSTEM FOR INTERCONNECTING END SYSTEMS OVER AN OPTICAL NETWORK

(75) Inventors: David Markham Drury, Pittsburgh, PA (US); Daniel Michael Flynn, Mars, PA (US); Eric John Helmsen, Wexford, PA (US); John Paul Rasmussen, Seven Fields, PA (US); Stephen Francis Bachor, Munhall, PA (US)

(73) Assignee: Accipiter Systems, Inc., Wexford, PA (US)

( * ) Notice: Subject to any disclaimer, the term of this patent is extended or adjusted under 35 U.S.C. 154(b) by 1054 days.

(21) Appl. No.: 11/334,617

(22) Filed: Jan. 18, 2006

(65) Prior Publication Data
US 2006/0159455 A1 Jul. 20, 2006

Related U.S. Application Data (60) Provisional application No. 60/644,626, filed on Jan. 18, 2005.

(51) Int. Cl.
*H04B 10/20* (2006.01)
(52) U.S. Cl. .............. 398/59; 398/49; 398/51; 398/50; 398/36; 398/99; 385/24; 385/89; 385/92; 385/93; 370/400; 370/389; 370/392; 370/395.31
(58) Field of Classification Search ............ 398/66, 398/69, 60, 59, 73, 79, 83, 164, 115, 116, 398/166, 165, 70, 71, 72, 100, 141, 135, 398/138, 139, 51, 36, 89, 99, 49, 54, 57; 385/24, 27, 31, 14, 15, 47, 88, 89, 92, 93; 370/85.3, 94.3, 400, 321, 322, 389, 392, 370/351, 347, 348, 355, 356, 445, 395.31
See application file for complete search history.

(56) References Cited

U.S. PATENT DOCUMENTS

| 5,319,642 | A * | 6/1994 | Ota ......................... 370/447 |
|---|---|---|---|
| 6,738,582 | B1 * | 5/2004 | Moshe et al. ............. 398/98 |
| 7,349,629 | B1 * | 3/2008 | Soderberg et al. ........ 398/60 |
| 2004/0076434 | A1 * | 4/2004 | Whittaker et al. ........ 398/69 |

(Continued)

FOREIGN PATENT DOCUMENTS

WO    WO 2005/125264 A1    12/2005

OTHER PUBLICATIONS

Cotter et al., Asynchronous Digital Regeneration and Networks, Dec. 1998, J. Lightwave Techn. 16(12):2068-2080.

(Continued)

*Primary Examiner*—Hanh Phan
(74) *Attorney, Agent, or Firm*—Pepper Hamilton LLP (57) ABSTRACT

Methods and systems for using a wavelength as an address in an optical network are disclosed. In particular, methods for selecting a wavelength for a particular node in an optical network, resolving a wavelength for a destination node in an optical network from a network address, and receiving and transmitting data packets at particular wavelengths are disclosed. A resulting system implementing such methods may significantly reduce space, weight and power measurements while transferring data at high rates for a data network.

10 Claims, 8 Drawing Sheets

U.S. PATENT DOCUMENTS

2005/0147411 A1* 7/2005 Hamou et al. .................. 398/59
2005/0207427 A1* 9/2005 Su et al. ..................... 370/400

OTHER PUBLICATIONS

Guillemot et al., Transparent Optical Packet Switching: The European ACTS KEOPS Project Approach, Dec. 1998, J. Lightwave Techn. 16(12):2117-2134.

Hunter et al., WASPNET: A Wavelength Switched Packet Network, Mar. 1999, IEEE Comm. Mag. pp. 120-129.

Wonglumsom et al., Hornet-A Packet-Switched WDM Network: Optical packet Transmission and Recofery, Dec. 1999, IEEE Phot. Techn. Lett. 11(12):1692-1694.

Crean et al., OPERA: An Optical Packet Experimental Routing Architecture with Label Swapping Capability, Dec. 1998, J. Lightwave Techn. 16(12):2135-2145.

Masetti et al., High Speed, High Capacity ATM Optical Switches for Future Telecommunication Transport Networks, Jun. 1996, IEEE J. Selected Areas in Commun. 14:979-998.

Chiaroni et al., Physical and Logical Validation of a Network Based on All-Optical Packet Switching Systems, Dec. 1998, J. Lightwave Techn. 16(12):2255-2264.

Hunter et al., Approaches to Optical Internet Packet Switching, Sep. 2000, IEEE Comm. Mag. pp. 116-122.

Vaughn et al., All-Optical Updating of Subcarrier Encoded Packet Headers with Simultaneous Wavelength Conversion of Baseband Payload in Semiconductor Optical Amplifiers, 1997, IEEE Photon. Lett. 9:827-829.

Chlamtac et al., CORD: Contention Resolution by Delay Lines, Jun. 1996, IEEE J. Selected Areas in Comm. 14(6):1014-1029.

Hunter et al., Buffering in Optical Packet Switches, Dec. 1998, J. Lightwave Tech. 16(12):2081-2094.

Hunter et al., SLOB: A Switch with Large Optical Buffers for Packet Switching, Oct. 1998, J. Lightwave Tech. 16(10):1725-1736.

Yao et al., Advances in Photonic Packet-Switching: An Overview, Feb. 2000, IEEE Comm. Mag. pp. 84-93.

Qiao et al., Optical Burst Switching (OBS)-A New Paradigm for an Optical Internet,Mar. 1999, in a special issue of J. High Speed Networks (JHSN) on WDM Networks, vol. 8(1):69-84.

Dolzer et al., Evaluation of reservation mechanisms for Optical Burst Switching, Jan. 2001, AEU International J. Electronics and Comm. 55(1).

Yoo et al., Optical Burst Switching for Service Differentiation in the Next-Generation Optical Internet, Feb. 2001, IEEE Comm. Mag. pp. 98-104.

Qiao, Labeled Optical Burst Switching for IP-over-WDM Networks, Sep. 2000, IEEE Comm. Mag. pp. 104-114.

Yoo et al., The Effect of Limited Fiber Dealy Lines on QoS Performance of Optical Burst Switched WDM Networks, Jun. 2000, Internat. Conf. on Comm. ICC, pp. 974-979.

Chaskar et al., A Framework to Support IP over WDM Using Optical Burst Switching, Jan. 2000, J. Selected Areas Comm., pp. 1-10.

* cited by examiner

METHOD AND SYSTEM FOR INTERCONNECTING END SYSTEMS OVER AN OPTICAL NETWORK

CROSS-REFERENCE TO RELATED APPLICATIONS

This patent application claims priority to, and incorporates by reference in its entirety, U.S. Provisional Patent Application No. 60/644,626, entitled "Distributed Lambda Labeled Router" and filed Jan. 18, 2005.

BACKGROUND

1. Technical Field

The disclosed embodiments generally relate to the fields of optical networks, data switching and data routing.

2. Description of the Related Art

Data networks have become ubiquitous. In November 2005, an online tracking service reported that an estimated 972 million people worldwide had Internet access. In the United States alone, over 200 million people have Internet access. Approximately 70 million users in the United States now use high-speed technologies, such as Digital Subscriber Lines (DSL), cable modems and the like for their Internet access. In general, an explosion of bandwidth has occurred as the popularity of the Internet has grown. Other high-speed protocols, such as Gigabit Ethernet and asynchronous transfer mode (ATM), have also been developed to make more data available to users more quickly.

Figure 1:
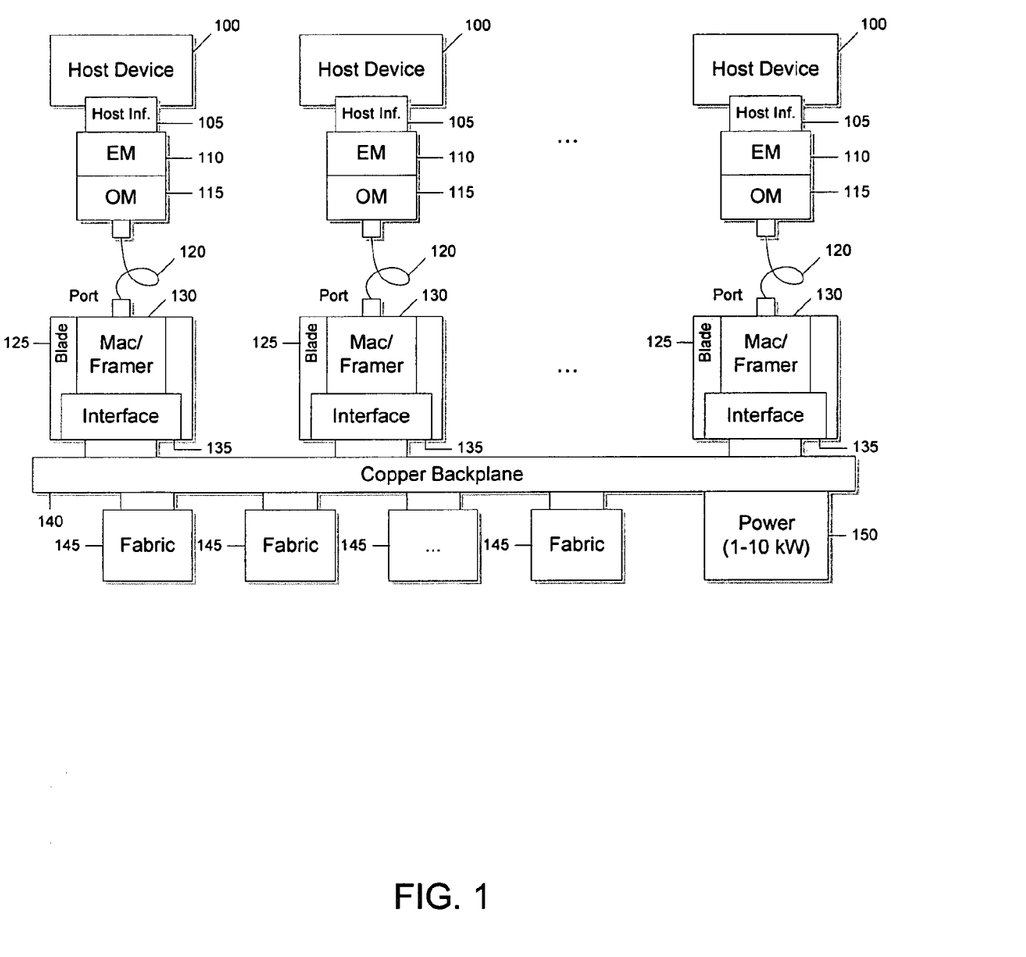
FIG. 1 depicts network components used in a convention networking system.

As a result, data networking switches, routers and other platforms that are employed in a business environment are primarily designed to provide a large amount of bandwidth to their users. For example, a conventional network architecture for a server farm is shown in FIG. 1 (1-1). As shown in FIG. 1, the hardware may include a host device 100, connected to an electronic module 110 and an optical module 115 by, for example, a host interface slot 105. An optical fiber 120 may then be connected to a port of a switching/routing blade 125. The blade may include a framer 130 and an interface 135 to the backplane 140 that connects the blade 125 to other blades and to fabrics 145. A power source 150 that typically supplies between about 1 kW and about 10 kW of power is used.

In a conventional server farm architecture, host devices 100 are interconnected via a routing or switching network. Typically, the host devices 100 use electronic switching. As a result, the host devices 100 are centrally located or located within close proximity to one another because electronic switching conventionally requires close proximity for the signals being switched. As the number of signals increases (i.e., as the bandwidth of the host devices 100 increases), the mechanism for switching the signals becomes denser. The need to move data in the electronic domain has led to a "backplane" interconnect design that forces internal hardware on the blades 125 to interface to the backplane 140 and fabric 145 electronics.

Since data networking has focused on providing high bandwidth, secondary concerns, such as the size of a network component, the weight of a network component and the power consumed by a network component have largely been ignored. For example, data networking components are generally set in racks that extend nearly from floor to ceiling and are approximately two feet in both width and depth. This is because the tight timing requirements of traditional network components described above have resulted in a centralized location for backplanes, blades and fabrics. In a typical business environment, entire rooms are dedicated to network components that provide an intranet backbone for the company.

Moreover, high-speed communication requirements have led to power-intensive electronics systems with a high number of interconnects. While power is considered in the development of network components, such components still typically draw large amounts of power. Power costs (including cooling costs) can affect a company's bottom line. Moreover, generating and supplying adequate power to a network component is a non-trivial design issue.

The high number of interconnects described above requires the backplane to have a large number of layers, be physically large in size, and be expensive. Accordingly, the copper backplane used in conventional network components must be wider if more line cards can be connected to it. The additional copper used in the backplane and the additional fabric cards required to support the backplane add a significant amount of weight to any conventional network solution. Moreover, power usage and heat dissipation are concentrated in a centralized location. The use of additional resources leads to increased cost for conventional network components, which again leads to a reduction in a company's bottom line.

As a result, businesses would benefit greatly from network components with reduced space, weight and power requirements. However, development has progressed slowly in this area. Instead, network components are simply made bigger, heavier, and to consume more power in the pursuit of supplying higher bandwidth.

In atypical environments, such as airborne or shipborne networks, space, weight and power become even more important for network design. However, the lack of progress in reducing the space, weight and power of network components described above has restricted the availability of high-bandwidth networks in such environments.

For example, space is at a premium on most airplanes and smaller ships. As such, network components of the size used in most business environments could exceed the available storage space in such environments. Data networks capable of providing on-demand video and audio programming to airplane passengers have developed slowly at least because of the size of conventional networking equipment. Similarly, military aircraft often require high-speed communication between subsystems or are used as a flying communication hub. However, conventional networking equipment is limited in its ability to perform this task because of the limited footprint that can be provided to all functions in an aircraft.

In addition, the weight of a network component has a direct effect on fuel consumption in airborne or shipborne environments as well since the added weight increases the drag on the airplane or ship.

Furthermore, the amount of power consumed by network components directly affects fuel consumption since power in airborne and shipborne environments is generated within the environment itself. For ships that are at sea for long periods of time, the power consumed by conventional networking equipment inhibits the ability to use such equipment because of the drain on limited energy reserves.

Accordingly, what is needed is a method and system for providing high bandwidth, low size, low weight, and low power.

A need exists for a method and system for providing high-bandwidth data networking in a self-contained environment.

A need exists for a method and system that provides a significant reduction in space, weight and power over existing systems.

A further need exists for a method and system that permits network components forming a network backbone to be decentralized to allow for better heat dissipation.

The present disclosure is directed to solving one or more of the above-listed problems.

SUMMARY

Before the present methods, systems and materials are described, it is to be understood that this disclosure is not limited to the particular methodologies, systems and materials described, as these may vary. It is also to be understood that the terminology used in the description is for the purpose of describing the particular versions or embodiments only, and is not intended to limit the scope.

It must also be noted that as used herein and in the appended claims, the singular forms "a," "an," and "the" include plural references unless the context clearly dictates otherwise. Thus, for example, reference to a "packet" is a reference to one or more packets and equivalents thereof known to those skilled in the art, and so forth. Unless defined otherwise, all technical and scientific terms used herein have the same meanings as commonly understood by one of ordinary skill in the art. Although any methods, materials, and devices similar or equivalent to those described herein can be used in the practice or testing of embodiments, the preferred methods, materials, and devices are now described. All publications mentioned herein are incorporated by reference. Nothing herein is to be construed as an admission that the embodiments described herein are not entitled to antedate such disclosure by virtue of prior invention.

In an embodiment, a method of determining a destination wavelength for a source node may include transmitting control information from a source node to a non-source node, receiving the control information at the non-source node, concatenating a wavelength designator for the non-source node to the received control information to produce updated control information, transmitting the updated control information to a next node, repeating the receiving, concatenating and second transmitting steps until the updated control information is received at the source node, determining the wavelength designators selected by non-source nodes from the updated control information, and selecting a wavelength designator for the source node that is different from each wavelength designator selected by a non-source node.

In an embodiment, a method of resolving a destination wavelength for a destination node may include transmitting control information from a source node, receiving the control information at a receiving node, determining whether the receiving node is a destination node based on the control information, transmitting the control information if the receiving node is not the destination node, transmitting a response packet including a wavelength designator for the destination node to the source node if the receiving node is the destination node, receiving the response packet at the source node, and updating mapping information including the wavelength designator for the destination node. The wavelength designator may correspond to a destination wavelength for the destination node.

In an embodiment, a method of transmitting a data packet from a source node may include receiving a data packet from a host, generating a packet header based on the lookup information, concatenating the packet header and the data packet to produce a concatenated data packet, and transmitting the concatenated data packet to the destination node. The data packet may include lookup information. The packet header may include a wavelength designator. The wavelength designator may correspond to a destination wavelength for a destination node.

In an embodiment, a method of processing received data may include receiving data including at least a portion of a data packet at a receiving node, and determining whether the received data is destined for the receiving node based on a wavelength at which the data is received. If the received data is destined for the receiving node, the received data may be stored in a storage medium and a determination may be made as to whether the data in the storage medium comprises a complete data packet. If the data in the storage medium comprises a complete data packet, a determination may be made as to whether the complete data packet is valid. If the complete data packet is valid, the complete data packet may be transmitted to a host interface.

BRIEF DESCRIPTION OF THE DRAWINGS

Aspects, features, benefits and advantages of the embodiments described herein will be apparent with regard to the following description, appended claims and accompanying drawings where:

DETAILED DESCRIPTION

A terabit optical Ethernet (TOE) network implementation may be used to solve the often ignored data networking issue of reducing space, weight and power (SWaP), while providing high bandwidth. TOE networks may solve significant switching/routing issues in, for example, airborne and shipborne defense and commercial applications, as well as in conventional business environments. While conventional network components may not satisfy requirements for applications in self-contained environments since they are not optimized to reduce SWaP, a network component designed in the spirit of the present disclosure may provide a significant (for example, three orders of magnitude or more) reduction in SWAP without compromising network bandwidth.

Figure 2:
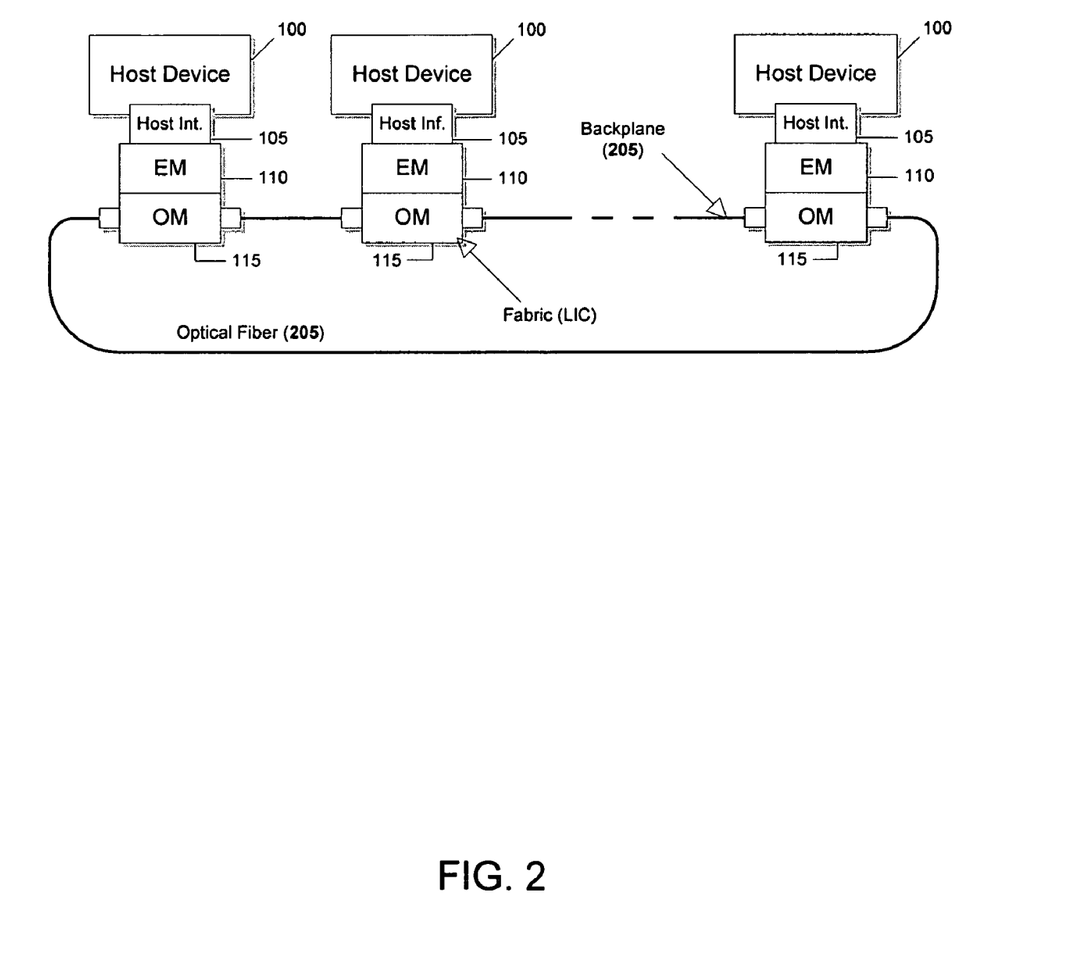
FIG. 2 depicts an exemplary high-level hardware implementation for a networking system according to an embodiment.

FIG. 2 (1-2) depicts an exemplary high-level hardware implementation for a networking system according to an embodiment. As compared to FIG. 1, the router/switch may be removed and replaced by optical fibers. The fibers may serve as the "backplane" for the networking system by allowing interconnection between line interfaces in a router/switch.

As shown in FIG. 2, host devices 100 may be interconnected using the fiber backplane 205. The host devices 100 may be the same as those used in the conventional data networking system of FIG. 1. However, the switching/routing elements (the electronic module 110 and the optical module 115) may be replaced by a lambda interface card (LIC), and fiber. In an embodiment, the host devices 100 may provide the power for the LIC.

Figure 3:
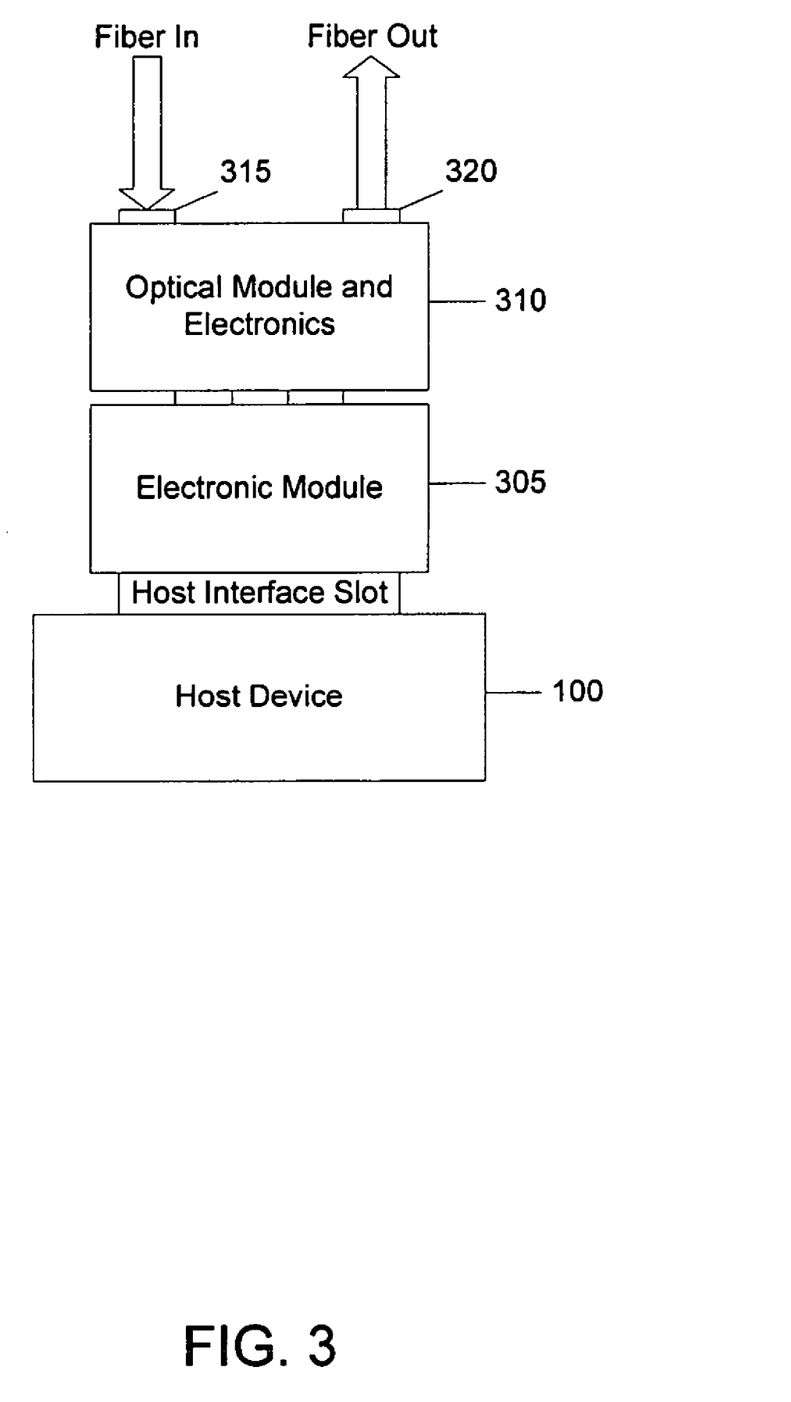
FIG. 3 depicts an architectural view of an exemplary lambda interface card and server according to an embodiment.

FIG. 3 (2-1) depicts an architectural view of an exemplary LIC and server according to an embodiment. The LIC may include all of the functionality required to implement one distributed segment of a TOE network. As shown, a host device 100 may be connected to an electronic module 305 and an optical module 310 via, for example, a PCI Express interface.

In an embodiment, the optical module 310 may include a tunable laser, such as those designed by Intune Technologies Ltd. of Dublin, Ireland. The optical module 310 may include components for transmitting laser light using a fiber optic cable at known frequencies. The optical module 310 may interface with an optical fiber ring structure via an input port 315 and an output port 320. The input port 315 may be used to receive data from other nodes in a network via, for example, a first optical fiber. The output port 320 may be used to transmit data to other nodes in the network via, for example, a second optical fiber.

Instead of directly using a network address to send information between nodes as in a conventional data network, the information may be transferred using light of a particular wavelength. The wavelength of light used to transmit data may uniquely identify, for example, the destination node. The process for assigning the wavelengths is discussed below. In an embodiment, the optical module 310 may support up to, for example, 160 wavelengths of light. More or fewer wavelengths may also be supported within the scope of this disclosure. The nodes may be aligned in a ring architecture. Accordingly, the number of nodes in the ring architecture may be less than or equal to the number of wavelengths supported by the optical module 310.

The electronic module 305 may be responsible for performing switching or routing decisions, network management, packet shaping, data storage and host interfacing functions. The electronic module 305 may further provide control logic for configuring the optical module 310.

The optical module 310 may forward all received data destined for the LIC to the electronic module 305. The electronic module 305 may collect data and reassemble the collected data into data packets, if necessary. The electronic module 305 may then process the data packets and forward the data packets to a host device associated with the electronic module.

The electronic module 305 and the optical module 310 may be combined into a single module or separated into multiple modules each containing some or all of the functionality of the electronic module 305 and/or the optical module 310 within the scope of the present disclosure. The embodiments presented herein are merely exemplary. The embodiments are intended to plainly describe some of the functions and features of each of an electronic module 305 and an optical module 310, although different functions and features may also be performed by such modules in other embodiments.

Figure 4:
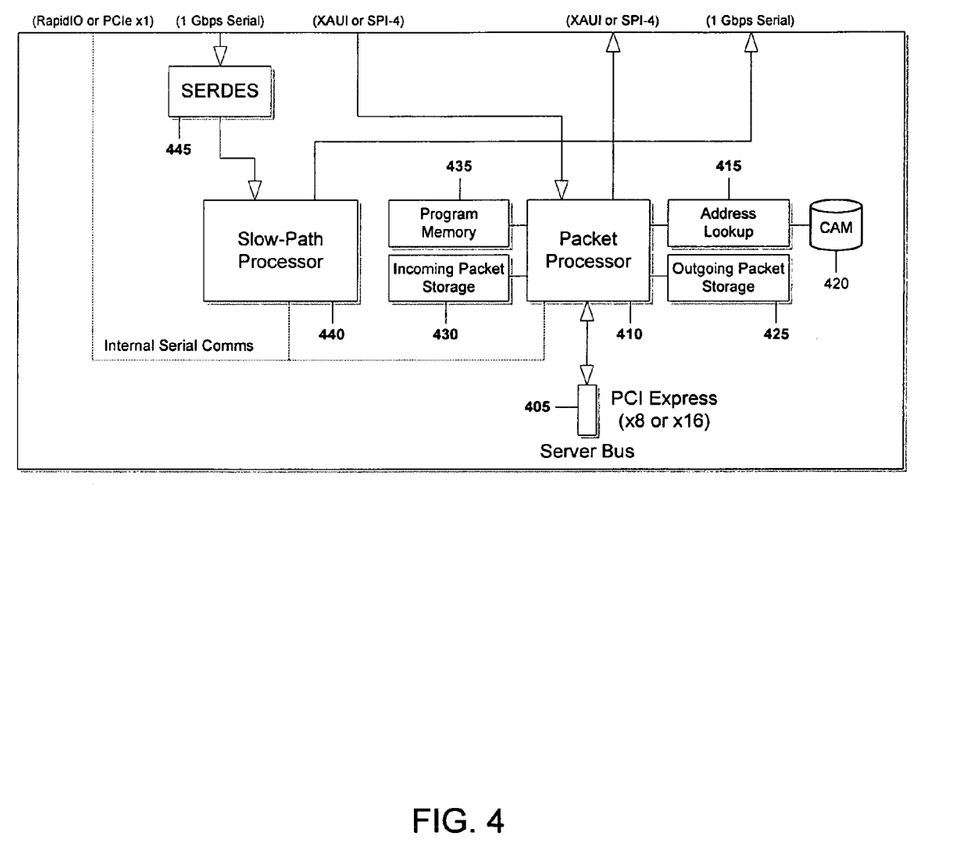
FIG. 4 depicts an exemplary system-level functional diagram of the electronic module according to an embodiment.

FIG. 4 (2-3) depicts an exemplary system-level functional diagram of the electronic module according to an embodiment. As shown in FIG. 4, the electronic module 305 may include a host interface 405, a packet processor 410, an address lookup table interface 415 associated with a Content Addressable Memory (CAM) 420, outgoing packet storage 425, incoming packet storage 430, program memory 435, a control processor 440, and a serial interface 445.

The packet processor 410 may transmit data to and receive data from a host device 100 via the host interface 405. In an embodiment, the host interface 405 may be a PCI Express interface. The packet processor 410 may further transmit data to and receive data from the optical module 310 via an optical module interface (not shown). In an embodiment, the optical module interface may be a XAUI interface. In an alternate embodiment, the optical module interface may be an SPI-4 interface. Other protocols may be used for either the host interface 405 or the optical module interface within the scope of this disclosure. In an embodiment, the packet processor 410 may include, for example, one or more processors, one or more network processors, one or more FPGAs and/or one or more ASICs.

The packet processor 410 may control data flow between the optical module 310 and the host interface 405. The packet processor 410 may be used to perform address lookups and concatenate headers with data packets destined for the optical module 310. In addition, the packet processor may be used to perform packet processing operations, including packet reassembly, for incoming data. Each of these operations is discussed in more detail below.

The packet processor 410 may parse data packets received from the host interface 405 to determine a network address for a destination node using the address lookup table interface 415. In an embodiment, the address lookup table interface 415 may be included within the packet processor 410. The address lookup table interface 415 may use the network address for the destination node to index a CAM 420 in order to return information needed for header generation. In an embodiment, the returned information may then be used to access a processor-readable storage medium to determine, for example, the wavelength designator for the destination node. In an embodiment, the processor-readable storage medium may comprise a ZBT SRAM. In an embodiment, all information needed for the packet header may be retrievable or derivable from the storage medium access. For example, the CAM 420 may be configured to support both layer 2 and layer 3 services by allowing for lookups based on either a Media Access Control (MAC) address or an Internet Protocol (IP) address. The use of a MAC address or an IP address may depend upon the services required for the data flow. Transparent Local Area Network switching may be supported via a bit that determines whether an Ethernet MAC header is stripped for layer 2 services prior to header encapsulation. Alternate or additional addresses may also be used within the scope of this disclosure. In an embodiment, the control processor 440 may configure the CAM 420 and/or the processor-readable storage medium in response to control packets received on a control wavelength. In an embodiment, in-band packets received by the packet processor 410 which are trapped and sent to the control processor 440 may be used to configure the CAM 420 and/or the processor-readable storage medium. In an embodiment, both configuration methods may be supported by a LIC.

The outgoing packet storage 425 may include a processor-readable storage medium for storing data and/or header information for data packets received from the host interface 405. In an embodiment, the packet processor 410 may store data pertaining to a packet in the outgoing packet storage 425 at least while an address lookup is being performed. In an embodiment, the packet processor 410 may store data pertaining to a packet in the outgoing packet storage 425 prior to transmission of the packet. Data pertaining to a packet may be stored in the outgoing packet storage 425 at other times without limitation within the scope of this disclosure. The outgoing packet storage 425 may be used by the packet processor 410 to perform packet processing, including, for example, concatenating a header on a packet received from the host interface 405.

The incoming packet storage 430 may include a processor-readable storage medium for storing data and/or header information for data received from the optical module 310. The incoming packet storage 430 may be used by the packet processor 410 to perform packet processing, including, for example, reassembling packet information received from the optical module 310.

The program memory 435 may include a processor-readable storage medium that contains processing instructions that control the operation of the packet processor 410.

In an embodiment, one or more of the outgoing packet storage 425, incoming packet storage 430 and program memory 435 may be contained within the same processor readable-storage medium. In an embodiment, each of the outgoing packet storage 425, the incoming packet storage 430 and the program memory 435 may be contained within different processor-readable storage media.

The control processor 440 may manage address lookup table information for a LIC. The control processor 440 may transmit and receive control information by using data paths that are daisy chained between adjacent LICs in a ring embodiment. In an embodiment, each data path may support data transfers at a rate of up to 1 Gbps. Higher or lower data transfer rates may also be used within the scope of this disclosure. These paths may enable LIC identification and traffic flow information to be shared among the LICs. Using this information, the control processor 440 may update and maintain the CAM 420 and perform various maintenance operations. The control processor 440 may be implemented using one or more processors, one or more ASICs, and/or one or more FPGAs.

In an embodiment, the serial interface 445 may include a serializer/deserializer (SERDES) for information received from the optical module 310. The SERDES may deserialize information received from the optical module 310. In an embodiment, the serial interface 445 may be able to transmit and receive information simultaneously. In an embodiment, the serial interface 445 may be able to transmit information at 1 Gbps and receive information at 1 Gbps. Other transmission and reception rates may also be encompassed within the scope of this disclosure.

Figure 5:
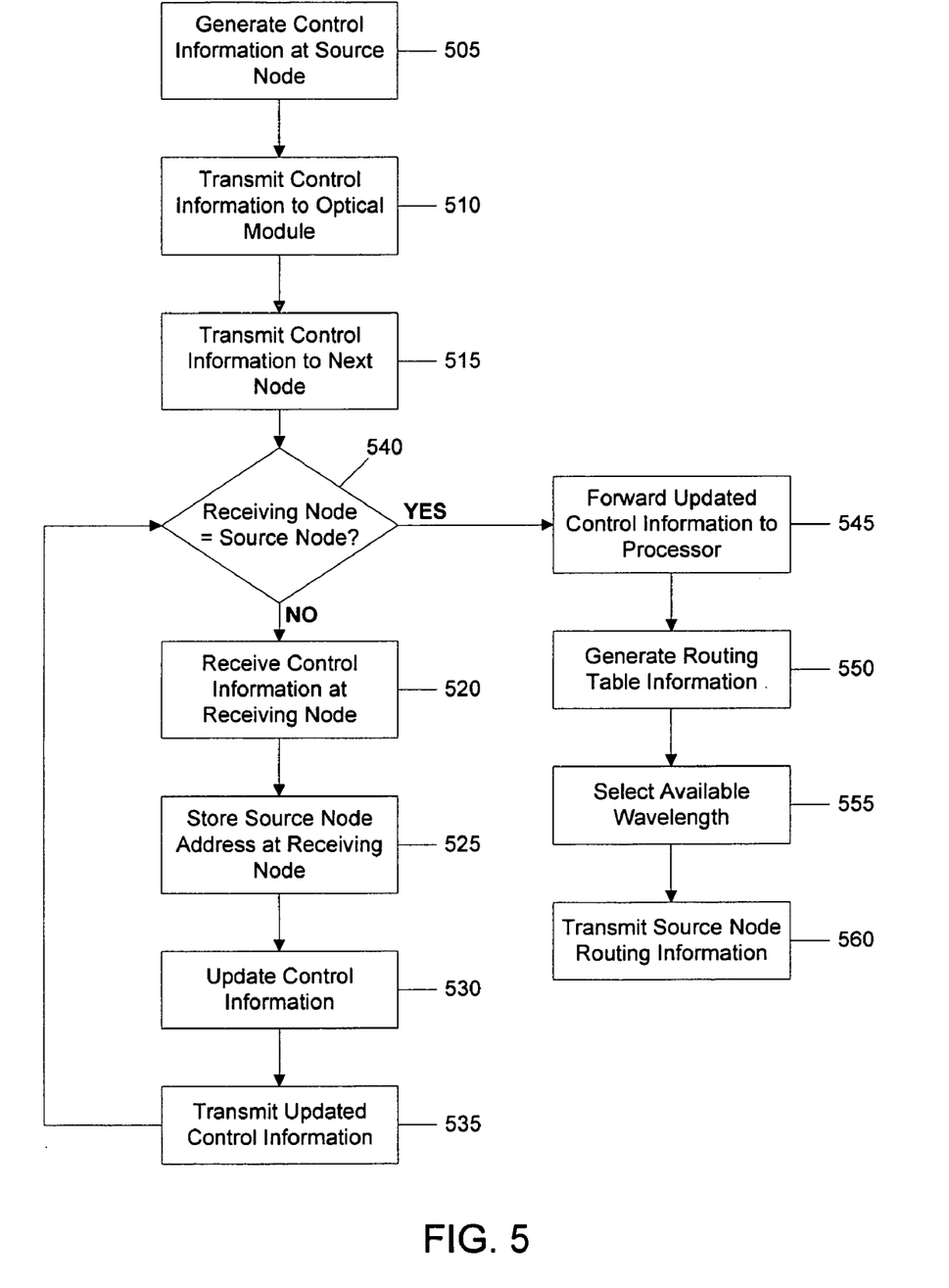
FIG. 5 depicts an exemplary process flow for a method of determining a wavelength for a local node according to an embodiment.

FIG. 5 depicts an exemplary process flow for a method of determining a wavelength for a local node according to an embodiment. A wavelength may be determined when a node first connects to an optical ring, after a reset operation, after failure recovery, or the like. The wavelength determination may correspond to determining a network address in a typical networking system in that a particular wavelength may correspond to only one node.

As shown in FIG. 5, an electronic module of a source node may generate 505 control information that requests a wavelength and may transmit 510 the control information to an optical module. The optical module may transmit 515 the control information to a next node in, for example, a ring configuration. The control information may initially include, for example, a network address, such as an IP address, for the source node.

A receiving node may receive 520 the control information, store 525 the address information pertaining to the source node, update 530 the control information with the receiving node's network address and wavelength, and transmit 535 the updated control information to the next node. In an embodiment, a wavelength designator may be used to designate the wavelength in the control information. The wavelength designator may include a numerical value. The receiving 520, storing 525, updating 530, and transmitting steps may be performed until the source node receives 540 the updated control information at its optical module. The source node may identify that it initiated the control information since its network address will be, for example, the first address in the control information.

The optical module of the source node may then forward 545 the control information to the electronic module. The source node may use the control information to generate 550 address lookup table information for the source node. The address lookup table information may include, without limitation, the network address and wavelength for each node that updated 530 the control information. The source node may then select 555 an available wavelength (i.e., a wavelength that is not used by another node). Address lookup table information, such as the network address and selected wavelength, for the source node may then be transmitted 560 to one or more other nodes. In an embodiment, such address lookup table information may be transmitted 560 to every node having a wavelength in the address lookup table of the source node.

In an embodiment, if two nodes are added to a network at substantially the same time, the two nodes, upon completing the wavelength determination process described in reference to FIG. 5, may select the same wavelength. To resolve this condition, a source node may transmit a plurality of test packets destined for the destination wavelength selected for the source node, such as by the process depicted in FIG. 5. If another node recognizes the destination wavelength of a first packet as its destination wavelength, the receiving node may modify the test packet to indicate that the source node has selected the receiving node's destination wavelength and may transmit the packet to the source node. The source node may receive the modified first test packet, recognize that it has selected a previously selected wavelength and select a new destination wavelength. The test packet process may then be repeated using the newly selected destination wavelength.

If the first test packet returns to the source node unmodified and a second test packet is modified before being returned to the source node, the source node may not transmit data packets until it receives a packet from the node that modified the second test packet. The source node may then modify the test packet to request that the other node select a new wavelength. The source node may then transmit test packets to its destination wavelength until it receives an unmodified test packet.

Figure 6:
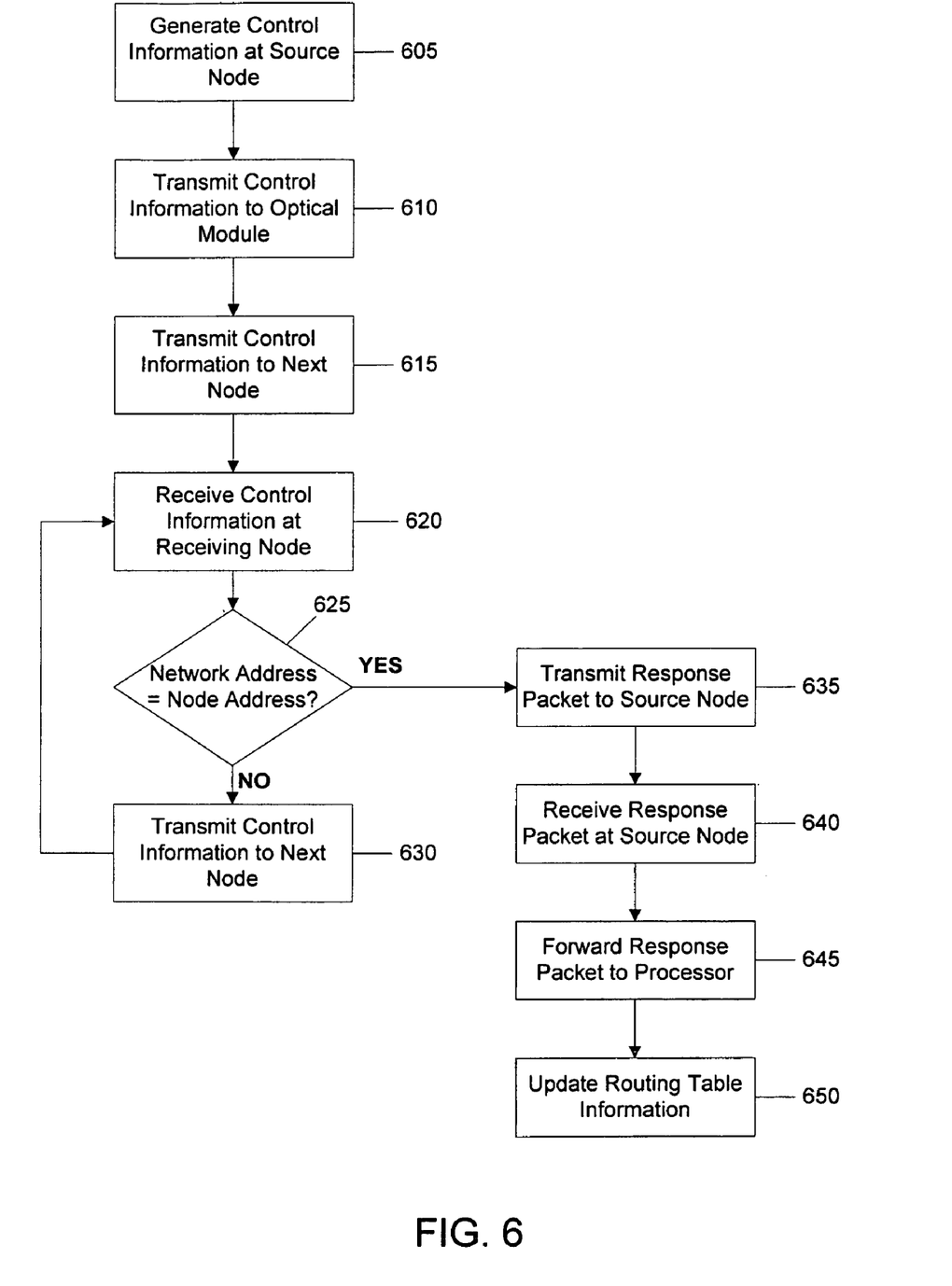
FIG. 6 depicts an exemplary process flow for a method of resolving a network wavelength for a destination node in an optical network according to an embodiment.

FIG. 6 depicts an exemplary process flow for a method of resolving a network wavelength for a destination node in an optical network according to an embodiment. The following process may be implemented, for example, when a source node wishes to transmit information to a destination node, but does not know the wavelength of the destination node.

As shown in FIG. 6, the electronic module of a source node may generate 605 control information and may forward 610 the control information to the optical module. In an embodiment, the control information may include a destination wavelength designator of the source node, a network address of the source node, and a network address of a destination node. The destination wavelength designator of the source node may correspond to a destination wavelength for the source node determined via a wavelength discovery process, such as the one described above in reference to FIG. 5. The network address for the source node may be determined from the host interface. The network address for the destination node may be determined, for example, from a previously received data packet. The optical module may transmit 615 the control information to the next node.

The next node may receive 620 the control information and determine 625 whether the network address of the destination node in the control information matches the network address for the node. If it doesn't, the node may transmit 630 the control information to the next node. If it does, the node may determine that it is the destination node. The destination node may transmit 635 a response packet to the source node that includes a wavelength designator. In an embodiment, this response packet may be sent as a regular data packet to expedite the process of providing the information to the source node. The response packet may be transmitted using the destination wavelength designated by the destination wavelength designator of the source node included in the control information.

When the source node receives 640 the response packet, the optical module may forward 645 the response packet to the electronic module. The electronic module may update 650 a switching/routing table based on the information contained in the response packet.

In an embodiment, in order to pass layer 3 data, such as Internet Protocol (IP) packets, a mapping between an IP address assigned to a host in a network and the wavelength assigned to the node at which the IP address exists may be formed. A mapping table may be stored in a CAM attached to the packet processor that retains this mapping in order to make the IP traffic transparent to the host. When a LIC receives a packet with an unknown address or a wavelength resolution protocol packet is received, the header information from the packet may be forward to a processor. The processor may store a new entry in the mapping table that associates an IP address contained in the packet with the source wavelength contained in the packet. The transmitter for the LIC may then use the IP address to perform the address mapping operation. In an embodiment, the IP address may not be translated to a MAC address prior to resolving the wavelength via the mapping table.

In an embodiment, in order to pass layer 2 data, such as Ethernet packets, a mapping between an MAC address assigned to a host in a network and the wavelength assigned to the node at which the MAC address exists may be formed. Layer 2 services may require that the Ethernet MAC address be used instead of an IP address for the wavelength resolution.

Figure 7:
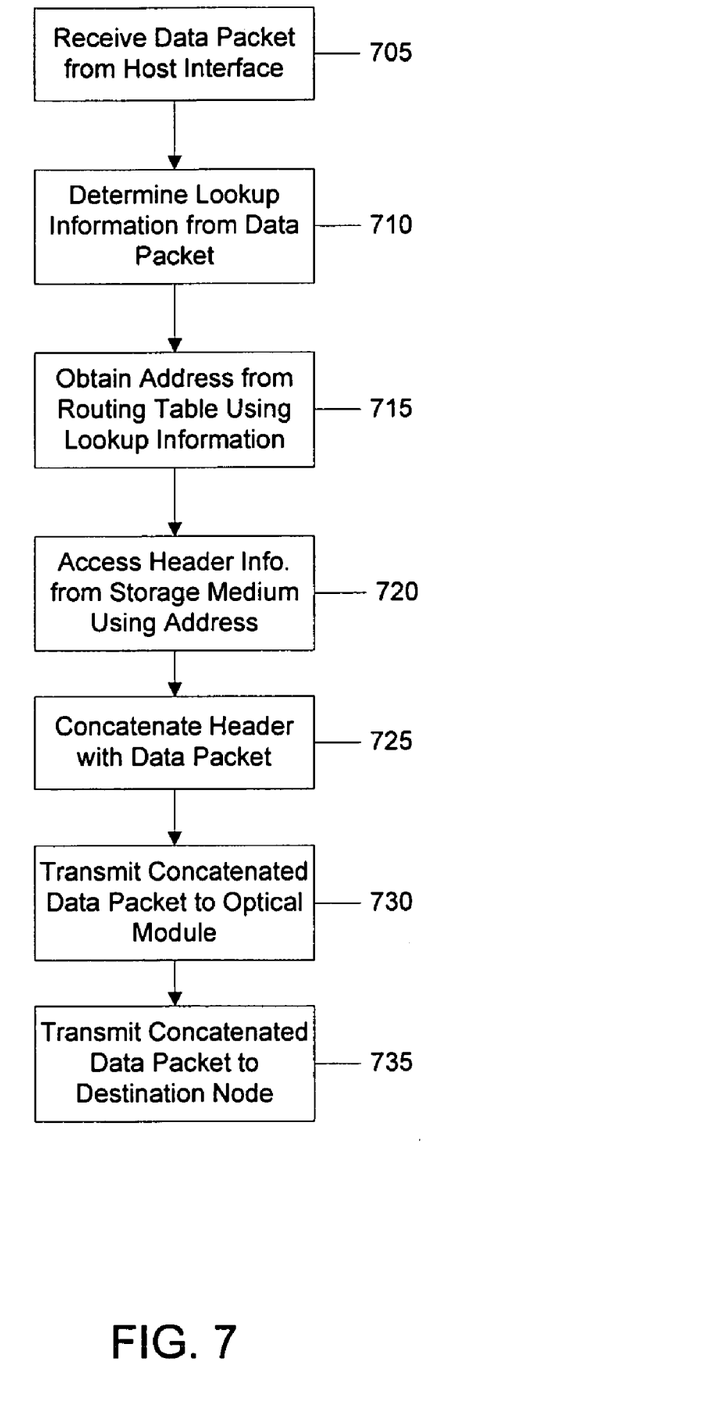
FIG. 7 depicts an exemplary process flow for a method of transmitting a data packet from a source node according to an embodiment.

FIG. 7 depicts an exemplary process flow for a method of transmitting a data packet from a source node according to an embodiment. A processor for a source node may receive 705 a data packet from a local device via the host interface. The processor may determine 710 lookup information from the data packet. In an embodiment, the lookup information may include a destination network address for the data packet. In an embodiment, additional data, such as information included in a conventional packet header, may also be included in the lookup information. In an embodiment, conventional packet headers may include an IP header, a SONET header, an Ethernet header and/or the like. Other packet headers, lookup information and/or address information may also be extracted, combined and/or otherwise used as part or all of the lookup information.

A data packet header may be generated using the lookup information. In an embodiment, generating a header may include accessing 715 a switching/routing table using the lookup information. In an embodiment, the switching/routing table may be contained within a CAM. The switching/routing table access may return an address. In an embodiment, the information stored in the CAM may be constructed using the wavelength resolution protocol described above in reference to FIG. 5 and/or one or more subsequent updates, such as an update performed when a new node is added to the network.

The processor may then access 720 a processor-readable storage medium with the address to retrieve packet header information. In an embodiment, the processor-readable storage medium may contain a header stored at the address. In an embodiment, the processor-readable storage medium may contain information stored at the address that is used to generate a header. In an embodiment, the processor-readable storage medium may comprise a ZBT SRAM.

Once the header is generated, the header may be concatenated 725 with the data packet. The data packet (with header) may then be forwarded 730 to the optical module and transmitted 735 to the destination node via the optical network.

Figure 8:
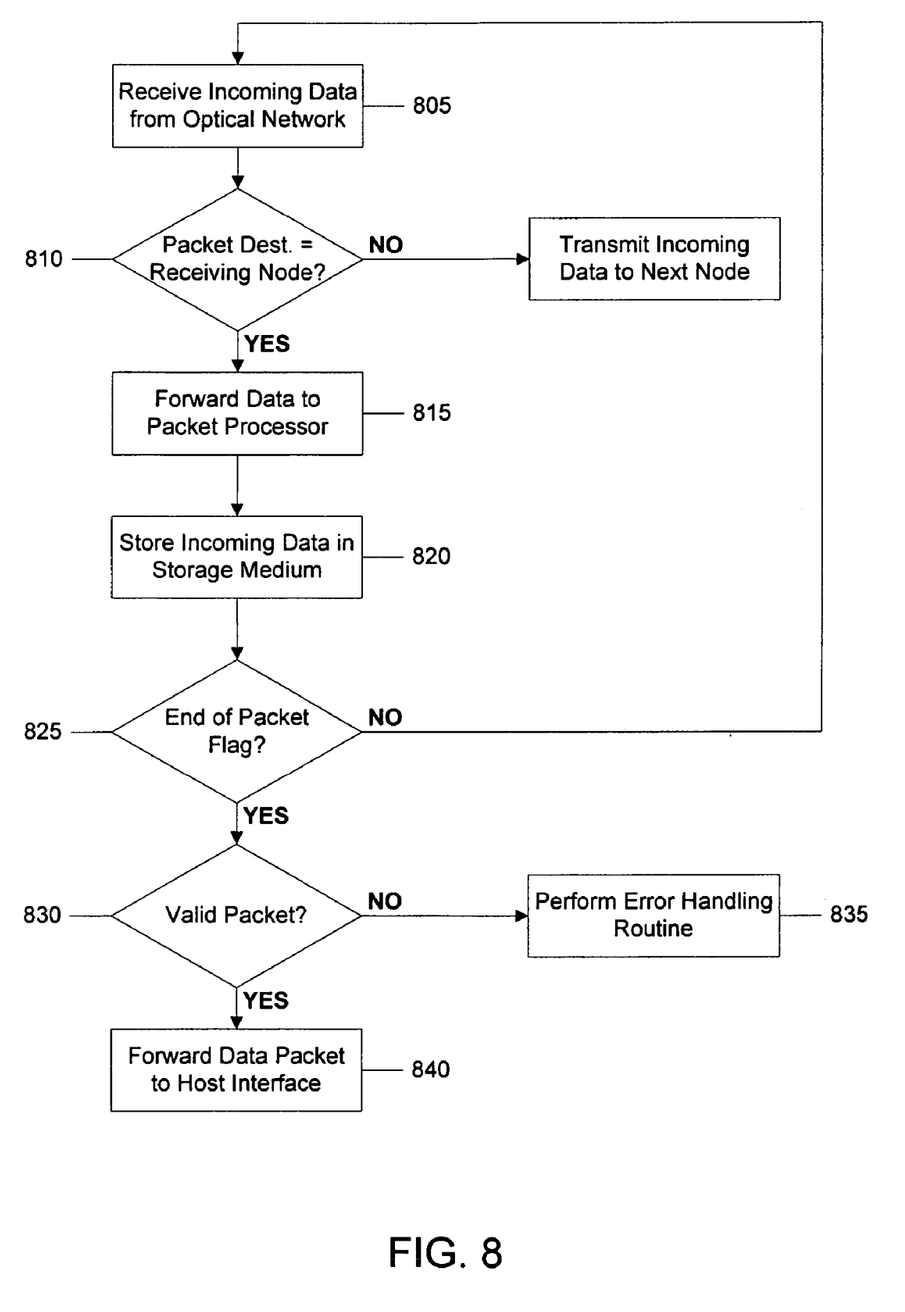
FIG. 8 depicts an exemplary process flow for a method of receiving data at a destination node according to an embodiment.

FIG. 8 depicts an exemplary process flow for a method of receiving data at a destination node according to an embodiment. An optical module may initially receive 805 incoming data from an optical network. The incoming data may include part or all of a data packet. A fragment (i.e., part) of a data packet may be received based upon traffic shaping operations performed at previous nodes in the optical network.

If the incoming data is determined 810 to be destined for the receiving node, the data may be forwarded 815 to a processor. The determination of the destination may be made based upon a wavelength at which the incoming data is transmitted. The processor may store 820 the incoming data in a storage medium. The incoming data may be stored in a buffer corresponding to the data packet with which the incoming data is associated.

The processor may then determine 825 whether an end of packet flag is set in the incoming data. If the end of packet flag is set, the processor may determine 830 the validity of the reassembled data packet. If the packet is determined to be invalid, an error handling operation may be performed 835. For example, an error message may be sent to the optical module. In an embodiment, the error message may be forwarded to the source node via the optical network. Alternately or additionally, the data packet may be discarded. In contrast, if the packet is determined to be valid, the data packet may be forwarded 840 to the host interface.

In an embodiment, a source-initiated multicast scheme may be used. In an embodiment, a source node may initiate a control packet that configures the intermediate nodes that forward the multicast packet prior to sending the packet. The control packet may include a list of all nodes that are destinations for the multicast packet. If a node receives the control packet and is not a destination node, the node may forward the control packet. Each node that receives the control packet and is a destination node may remove its listing from the destination list of the control packet, set up a local connection for receiving the multicast packet, and forward the revised packet (i.e., without the listing for the node in the multicast destination list). Each node may then transmit a control packet to the source node to inform the source node that the node is configured to support the multicast connection, and to notify the source node of the node's neighbors (i.e., the node from which the node is receiving data via the multicast connection and the node to which the node is transmitting data via the multicast connection) in the multicast sending list.

Once the source node receives acknowledgment packets from all destination nodes, the multicast connection may be activated. The source node may then send the multicast packet to the first node. The multicast packet may include a designation that it is a multicast packet and may be transmitted at the destination wavelength of the first destination node. After the multicast packet has been received and processed by the first destination node, the first destination node may resend the packet to a second destination node with the designation that the packet is a multicast packet. The resent packet may be transmitted at the wavelength of the second destination node. Each destination node may update the wavelength based on the next node in the multicast destination list.

If one or more new destination nodes have to be added to a multicast connection, the source node may send a control packet to the last node in the list and the connection may be formed as described above. If a destination node is to be removed from the multicast connection, a control packet may be sent to the destination node preceding the removed destination node in the multicast list with an indication to break the multicast connection with the removed node and to configure a connection with the node to which the removed node was sending data.

A header may be appended to a multicast packet designating the packet as part of a multicast connection. In an embodiment, the header may include a source node wavelength designator and a unique identifier. In an embodiment, the unique identifier may be a non-negative integer. In an embodiment, the unique identifier may be restricted to be no greater than a known value (i.e., to limit the number of multicast connections from any one source node to the known value).

In an embodiment, a gateway node may be used to interconnect, for example, two or more rings in a network. In an embodiment, a gateway node may comprise one LIC for each ring that is interconnected. In an embodiment, each LIC for a gateway node may be connected to a host device. In an alternate embodiment, a single device may support two or more LICs. In an embodiment, when transferring data between rings, data may be sent to a gateway node at a first wavelength. The network address for the destination node, included in the data, may then be translated to a second wavelength based on an address lookup table for the outgoing ring. The data may then be transmitted on the outgoing ring. Address lookup tables for one or more rings may be combined into a single address lookup table.

The above-disclosed embodiments and/or equivalents or extensions apparent to those of ordinary skill in the art based on this disclosure may be implemented on any of a plurality of devices. For example, the above-disclosed embodiments are described in reference to a LIC. In addition, a gateway has been disclosed that can connect two network ring architectures. Other exemplary devices may include, for example, a router, a line interface card for a switch or router that typically operates using a different protocol, and an aggregation device uplink. A router may be a device that can connect two or more network ring architectures. A gateway may be a particular type of router that can connect two network ring architectures. The line interface card may be inserted into a switch or router, such as any router from Cisco Systems, Inc., to interface between, for example, a network ring architecture as described above and a conventional network. The aggregation device uplink may be an uplink module for, for example, an Ethernet router. In an embodiment, the uplink module may be fixed within the Ethernet router.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A method of determining a destination wavelength for a source node, the method comprising:
   transmitting control information from a source node to a non-source node;
   receiving the control information at the non-source node;
   concatenating a wavelength designator for the non-source node to the received control information to produce updated control information;
   transmitting the updated control information to a next node;
   repeating the receiving, concatenating and second transmitting steps until the updated control information is received at the source node, wherein the updated control information does not authorize a data transmission between the source node and any non-source node;
   determining the wavelength designators for the non-source nodes from the updated control information; and
   selecting a wavelength designator for the source node different from the wavelength designators for the non-source nodes.

2. The method of claim 1 wherein the control information comprises an address for the source node.

3. The method of claim 2, further comprising:
   storing the address for the source node in a table of at least one non-source node.

4. The method of claim 1 wherein concatenating further comprises concatenating a network address for the non-source node to the received control information.

5. The method of claim 4, further comprising:
   storing mapping information at the source node, wherein the mapping information comprises, for each non-source node, the wavelength designator for the non-source node and the network address for the non-source node.

6. The method of claim 1 wherein each wavelength designator corresponds to a destination wavelength for the corresponding node.

7. The method of claim 1 wherein each wavelength designator comprises a numerical value.

8. A method of resolving a destination wavelength for a destination node, the method comprising:
   transmitting control information from a source node, wherein the control information comprises a network address for a destination node, a destination wavelength of the source node, and a network address of the source node;
   receiving the control information at a receiving node;
   determining whether the receiving node is the destination node based on the control information;
   if the receiving node is not the destination node, transmitting the control information;
   if the receiving node is the destination node, transmitting a response packet to the source node, wherein the response packet includes a wavelength designator for the destination node, wherein the wavelength designator corresponds to a destination wavelength for the destination node;
   receiving the response packet at the source node, wherein the response packet does not authorize a data transmission between the source node and the destination node; and
   updating mapping information, wherein the mapping information comprises the wavelength designator for the destination node.

9. The method of claim 8 wherein determining whether the receiving node is a destination node comprises comparing the network address for the destination node in the control information with a network address for the receiving node.

10. The method of claim 8 wherein the response packet further includes a network address for the destination node.

* * * * *